Jan. 11, 1966    M. T. OLLIFF, JR    3,228,654
FLOW CONTROL VALVE FOR USE WITH UNCURED SOLID PROPELLANTS
Filed June 19, 1963

Martin T. Olliff Jr.
INVENTOR.

Attorney

United States Patent Office 3,228,654
Patented Jan. 11, 1966

3,228,654
FLOW CONTROL VALVE FOR USE WITH
UNCURED SOLID PROPELLANTS
Martin T. Olliff, Jr., Huntsville, Ala., assignor to Thiokol
Chemical Corporation, Bristol, Pa., a corporation of
Delaware
Filed June 19, 1963, Ser. No. 289,101
1 Claim. (Cl. 251—309)

This invention relates to improvements in flow control valves that are used to regulate the flow of uncured solid propellant during casting operations but, more particularly, to a flow control valve wherein there is no metal-to-metal contact within the valve during its periods of operation.

The flow control valve forming the basis for the instant invention has two outstanding features: One, a positive clearance is provided between the plug valve and the valve body so that, when the plug valve is in closed position, low viscosity material will leak past the plug valve, while high viscosity materials such as solid propellants will not leak past the plug valve. Second, the clearance referred to provides a flow control valve in which there is no metal-to-metal contact and appropriate O-rings are provided to preserve the clearance and prevent leakage outside of the valve body.

The flow control valve of the present invention is manually operated and can be fabricated from light-weight or heavy-weight metals depending on the specific solid propellant that the flow of which is to be regulated by the flow control valve of the present invention.

An object of this invention is, therefore, to provide a flow control valve that provides a safe operation in regulating the flow of solid propellants, since it has no metal-to-metal contacts between the elements thereof, thus eliminating a fire hazard that could exist if a spark was caused by the metal-to-metal contact of the various elements of the flow control valve.

Another object of the invention is to provide a flow control valve that is simple in construction, efficient in operation, and will provide positive action in regulating the flow of solid propellants during casting operations.

Figure 1:
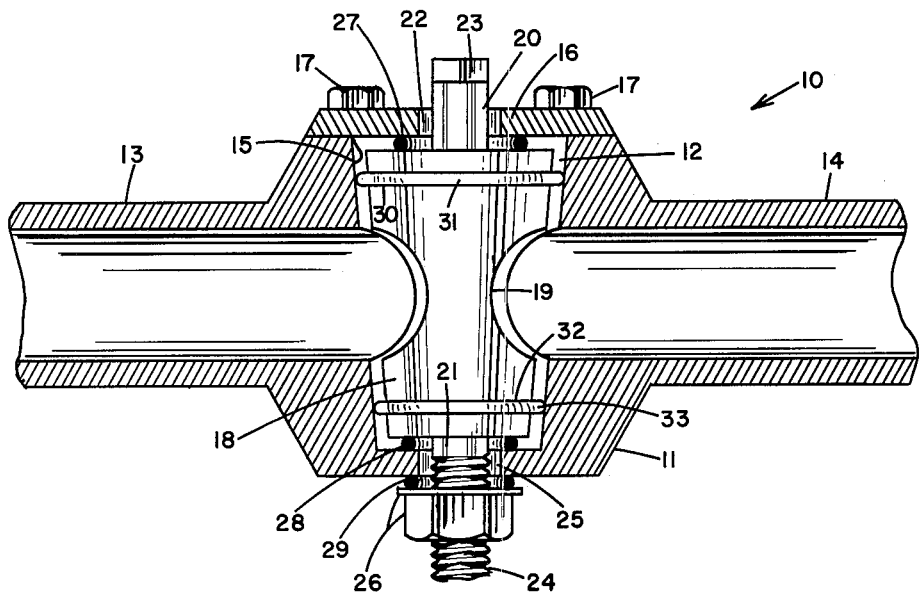
Figure 2:
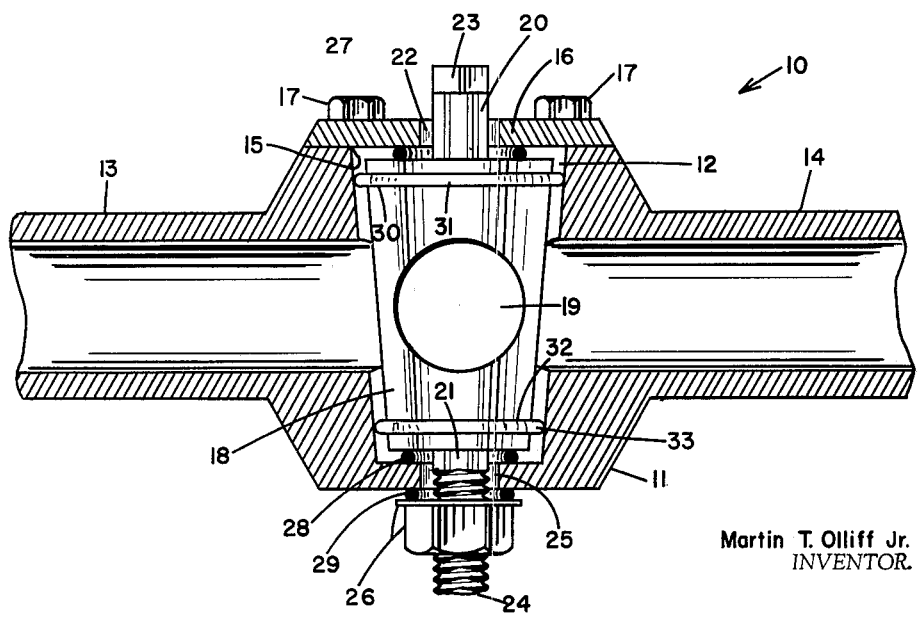

With the above and other objects and advantages in view, the invention consists of the novel details of construction, arrangement, and combination of parts more fully hereinafter described, claimed, and illustrated in the accompanying drawings in which:

FIGURE 1 is a view, partly in elevation and partly in section, showing the flow control valve embodying the invention, in open position, and FIGURE 2 is a view similar to FIGURE 1 with the flow control valve in closed position.

Referring more in detail to the drawings wherein like parts are designated by like reference numerals, the reference numeral 10 is used to generally designate a flow control valve embodying the present invention.

The flow control valve 10 comprises a valve body 11 having a cavity therein, and the wall of said cavity defining thereby a longitudinally-tapered valve chamber 12, and diametrically-opposed, outwardly-extending, input-output pipe ends 13 and 14 respectively that communicate directly with the chamber 12 in the valve body 11.

The valve body 11 has an access opening 15 at the top thereof, which is closed by a cover plate 16 that is detachably connected to the valve body 11 by machine bolts 17.

A longitudinally-tapered plug valve 18 having a transversely-extending passageway 19 therein is mounted for rotation in the chamber 12 by means of a top stem 20 and a bottom stem 21 both of which are integral with the plug valve 18. The top stem 20 extends outwardly of the valve body 11 by means of an enlarged opening 22 in the cover plate 16 and the stem 20 has a preformed end 23 thereon on which a hand wheel, not shown, may be fastened for the manual rotation of the plug valve 18. The end of the bottom stem 21 is threaded as at 24 and this end extends through an enlarged opening 25 in the bottom of the valve body 11 that communicates with the chamber 12 therein. A nut and washer combination 26 is threaded onto the threaded end 24 and regulates the position of the plug valve 18 within the chamber 12.

There is a top O-ring 27 positioned on the top stem 20 intermediate of the cover plate 16 and the top of the plug valve 18; and a bottom O-ring 28 is positioned on the bottom stem 21 intermediate of the bottom of the plug valve 18 and the bottom of the valve body 11, at the bottom of the chamber 12. An outer O-ring 29 is also positioned on the bottom stem 21 intermediate of the outer surface of the bottom of the valve body 11 and the nut and washer combination 26. The plug valve 18 has an upper annular groove 30 at the top thereof in which is positioned an upper O-ring 31, and a lower annular groove 32 at the bttom thereof in which is positioned a lower O-ring 33.

The figures of the drawings clearly show a clearance between the outer surface of the plug valve 18 and the wall surface of the chamber 12, and such clearance is greater than the clearance that is usually provided in similar valves, which provide small working clearances to prevent leakage of the conventional valve. The top and bottom O-rings 27 and 28 on the stems 20 and 21 respectively, maintain the clearance at the top and bottom of the plug valve 18, while the upper and lower O-rings 31 and 33 on the plug valve 18 maintain the clearance between the outer surface of the plug valve 18 and the wall surface of the chamber 12.

The O-rings thus prevent metal-to-metal contact between the plug valve 18 and the wall surface of the chamber 12 while, at the same time, maintaining the clearance therebetween, as previously set forth. To effectively eliminate any other metal-to-metal contact between the stem 21 and the valve body 11, the O-ring 29 is, as previously stated, mounted on the stem 21 intermediate of the bottom of the valve body 11 and the nut and washer combination 26.

The operation of the flow control valve 10 is similar in all respects as to valves of this type, the plug valve 18 being rotated to permit flow through the valve body 11 or stop flow through the valve body 11. However, in the instant flow control valve 10, material of low viscosity will leak past the plug valve 18 but materials of high viscosity, such as solid propellant, will not leak past the plug valve 18.

It is important in the operation of the flow control valve 10 that all of the O-rings be maintained in perfect working condition to carry out the operation of the flow control valve as previously set forth. This maintenance will not impose any hardship on the operator thereof, since the flow control valve 10 must be disassembled and cleaned after every casting operation. The disassembly of the flow control valve 10 being easily accomplished by removing the bolts 17 and cover plate 16 and removing the nut and washer combination 26 from the threaded end 24 of the bottom stem 21.

It is believed that, from the foregoing description, the operation, purpose, and construction of the flow control valve 10 will be clearly understandable to those skilled in the art; and it is to be understood that variations in the structure of the flow control valve 10 may be adhered to provided such variations fall within the spirit of the invention and the scope of the appended claims.

Having thus described the invention, what is claimed as new and desired to be secured by Letters Patent is:

A flow control valve for use with solid propellants during casting operations comprising a valve body having a longitudinally tapered valve chamber therein, and an access opening in the top thereof communicating with said valve chamber, a longitudinally tapered plug valve having a transversely-extending passageway therein mounted for rotation within said valve chamber, a top stem and a bottom stem integral with the top and bottom of said plug valve, a cover plate having an enlarged opening therein through which said top stem extends detachably connected to said valve body to close said access opening, said valve body having an enlarged opening in the bottom thereof through which said bottom stem extends, there being a clearance between the plug valve and the valve chamber to permit leakage of materials of low viscosity past said plug valve, sealing means mounted on said top and bottom stems and on the outer surface of said plug valve to maintain the clearance between said plug valve and said valve chamber, said sealing means comprising top and bottom O-rings that are positioned on said top and bottom stems intermediate of the top and bottom of said plug valve and the top and bottom of said valve body and upper and lower O-rings on said plug valve that are interposed between the plug valve and the valve chamber, said bottom stem having a threaded end portion thereon, an O-ring positioned on said end portion in contact with the outer surface of said valve body and a nut and washer combination threaded on said threaded end portion of said bottom stem to maintain said plug valve in proper position in said valve chamber.

References Cited by the Examiner

UNITED STATES PATENTS

| | | | |
|---|---|---|---|
| Re. 17,556 | 1/1930 | Heylman | 251—161 |
| 1,416,173 | 5/1922 | Conrath | 251—188 |
| 2,820,470 | 1/1958 | Sanders | 251—312 X |
| 3,048,191 | 8/1962 | Crang | 251—317 X |

FOREIGN PATENTS 1,105,612   7/1955   France.

M. CARY NELSON, *Primary Examiner.*

MARTIN P. SCHWADRON, A. JAFFE, *Examiners.*